(12) United States Patent
Weitersberger

(10) Patent No.: US 11,938,973 B2
(45) Date of Patent: Mar. 26, 2024

(54) RAIL VEHICLE

(71) Applicant: PLASSER & THEURER EXPORT VON BAHNBAUMASCHINEN GMBH, Vienna (AT)

(72) Inventor: Christian Weitersberger, St. Georgen an der Gusen (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 823 days.

(21) Appl. No.: 16/614,447

(22) PCT Filed: Apr. 20, 2018

(86) PCT No.: PCT/EP2018/060130
§ 371 (c)(1),
(2) Date: Nov. 18, 2019

(87) PCT Pub. No.: WO2018/210526
PCT Pub. Date: Nov. 22, 2018

(65) Prior Publication Data
US 2020/0189624 A1    Jun. 18, 2020

(30) Foreign Application Priority Data
May 18, 2017    (AT) .................. A 209/2017

(51) Int. Cl.
*B61C 17/06*    (2006.01)
*B60L 50/60*    (2019.01)
(Continued)

(52) U.S. Cl.
CPC .............. *B61C 17/06* (2013.01); *B60L 50/64* (2019.02); *B60L 50/66* (2019.02); *B61C 3/02* (2013.01);
(Continued)

(58) Field of Classification Search
CPC ............. B60L 2200/26; B60L 2240/36; B60L 2240/545; B60L 3/0046; B60L 50/64;
(Continued)

(56) References Cited

U.S. PATENT DOCUMENTS

2005/0269995 A1\* 12/2005 Donnelly ................ B60L 58/14
320/150
2008/0264291 A1 10/2008 Pike et al.
(Continued)

FOREIGN PATENT DOCUMENTS

CN      103094640 A     5/2013
DE      102004054060 B3  6/2006
(Continued)

OTHER PUBLICATIONS

Machine translation of Japanese Patent Publication No. 2016-130047, published Jul. 21, 2016. (Year: 2016).\*

*Primary Examiner* — Stewart A Fraser
*Assistant Examiner* — Lilia Nedialkova
(74) *Attorney, Agent, or Firm* — Laurence A. Greenberg; Werner H. Stemer; Ralph E. Locher

(57) ABSTRACT

A rail vehicle has a vehicle frame, supported on track undercarriages, and a vehicle superstructure with at least one driver's cabin. A motive drive is provided and has an electric motor supplied by an electric energy store. In this, it is provided that the energy store has a tempering by use of a liquid dielectric, and that the vehicle superstructure includes a compartment, separated from the driver's cabin, in which the electric energy store is arranged within at least one fire protection cabinet with a dielectric tank located there above.

11 Claims, 4 Drawing Sheets

(51) Int. Cl.
*B60L 50/64* (2019.01)
*B61C 3/02* (2006.01)
*H01M 10/48* (2006.01)
*H01M 10/613* (2014.01)
*H01M 10/625* (2014.01)
*H01M 10/6556* (2014.01)
*H01M 10/6568* (2014.01)
*H01M 50/204* (2021.01)
*H01M 50/24* (2021.01)
*H01M 50/249* (2021.01)

(52) U.S. Cl.
CPC ....... *H01M 10/486* (2013.01); *H01M 10/613* (2015.04); *H01M 10/625* (2015.04); *H01M 10/6556* (2015.04); *H01M 10/6568* (2015.04); *H01M 50/204* (2021.01); *H01M 50/24* (2021.01); *H01M 50/249* (2021.01); *B60L 2200/26* (2013.01); *H01M 2220/20* (2013.01)

(58) Field of Classification Search
CPC ...... B60L 50/66; B60L 58/26; H01M 10/486; H01M 10/613; H01M 10/625; H01M 10/6556; H01M 10/6567; H01M 10/6568; H01M 2200/00; H01M 2220/20; H01M 50/20; H01M 50/24; H01M 50/204; H01M 50/249; A62C 3/07; A62C 3/16; B61C 17/06; B61C 3/02; B61D 15/00; Y02E 60/10
See application file for complete search history.

(56) References Cited

U.S. PATENT DOCUMENTS

| | | | |
|---|---|---|---|
| 2010/0205982 | A1 | 8/2010 | Eckert et al. |
| 2014/0121869 | A1* | 5/2014 | Lee .................. H01M 10/625 701/22 |
| 2014/0260217 | A1 | 9/2014 | Cook |
| 2015/0246615 | A1 | 9/2015 | Rohfling |
| 2019/0363411 | A1* | 11/2019 | Takeuchi .......... H01M 10/6552 |

FOREIGN PATENT DOCUMENTS

| | | |
|---|---|---|
| DE | 102007046369 A1 | 4/2009 |
| DE | 102009050921 A1 | 4/2011 |
| DE | 102012214262 A1 | 2/2014 |
| DE | 102012018051 A1 | 3/2014 |
| DE | 102012216312 A1 | 3/2014 |
| DE | 102013200734 A1 | 7/2014 |
| DE | 102013219481 A1 | 4/2015 |
| DE | 102013225582 A1 | 6/2015 |
| DE | 102014210762 A1 | 12/2015 |
| DE | 102015220601 A1 | 4/2017 |
| EP | 2187473 A1 | 5/2010 |
| JP | 3972383 B2 | 9/2007 |
| JP | 2016130047 A | 7/2016 |
| WO | 2014098675 A1 | 6/2014 |

* cited by examiner

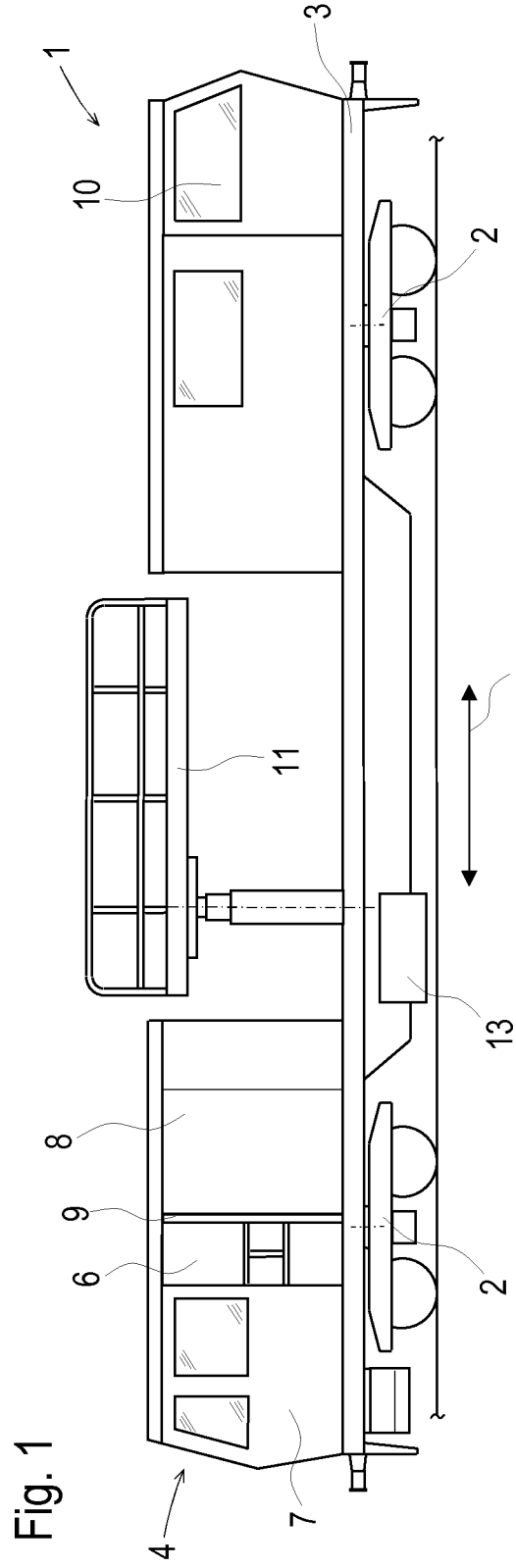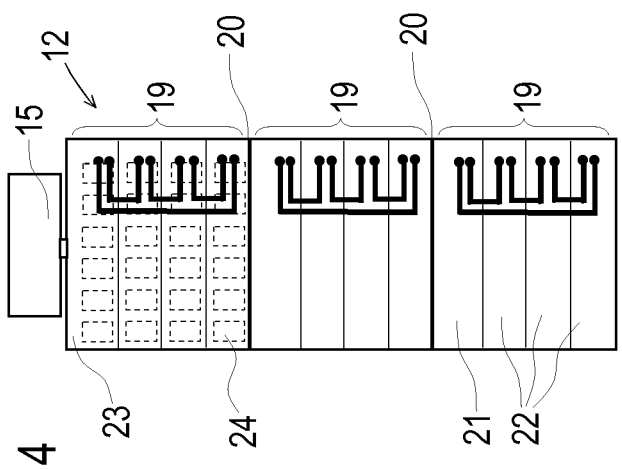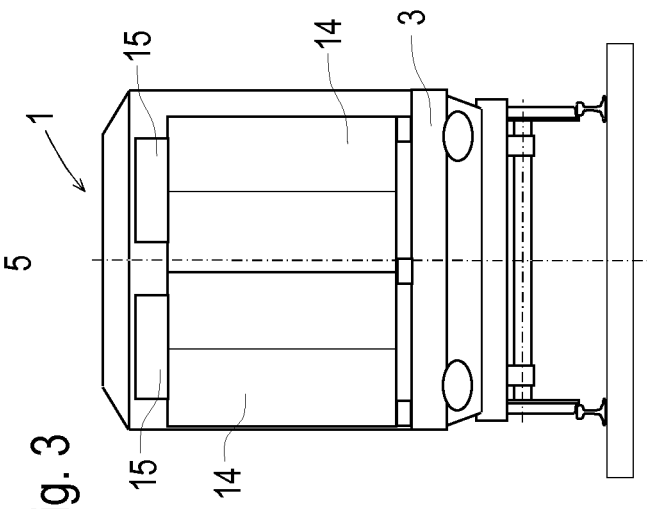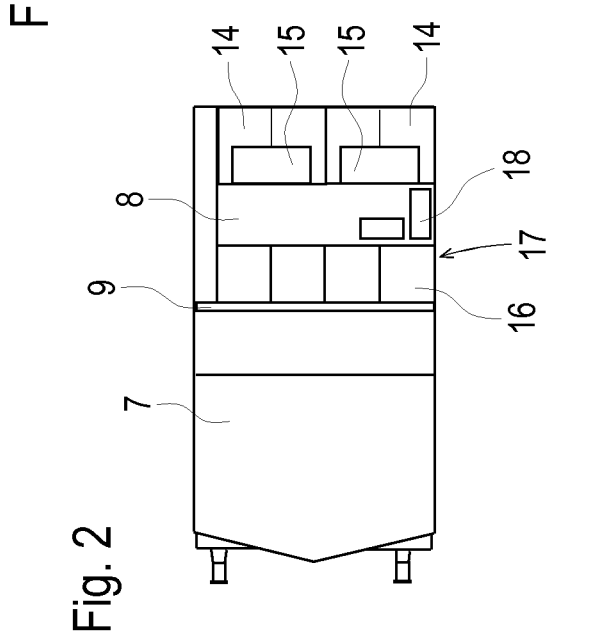

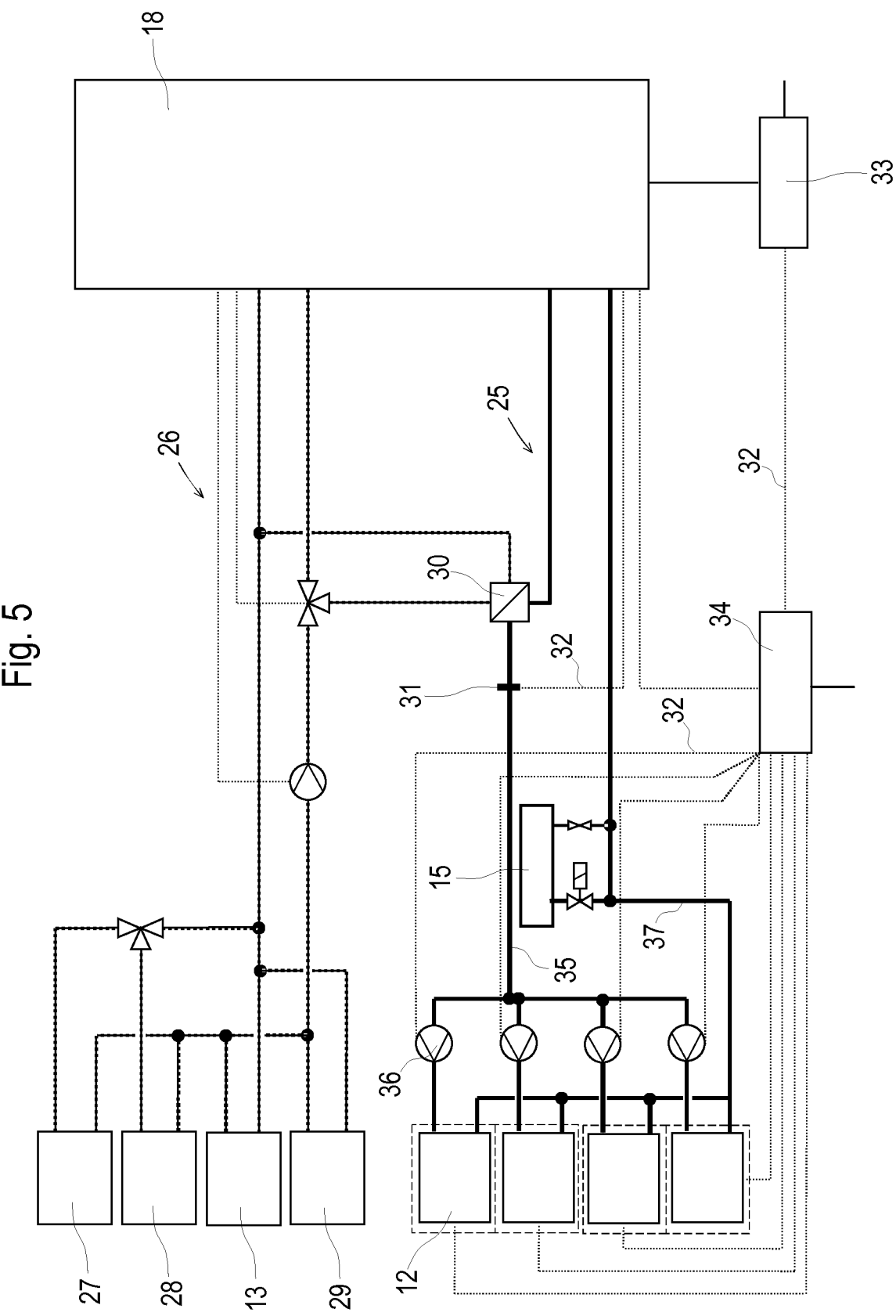

RAIL VEHICLE

FIELD OF TECHNOLOGY

Prior Art

As a result of ever stricter environmental requirements, innovative power concepts are increasingly used not only in the automotive industry. Battery-powered railcars and diesel-hybrid railcars have been known for several years also in the rail vehicle construction sector. Based on ever more efficient, lighter and inexpensive-to-manufacture accumulators, these constitute an attractive alternative for the future. Especially for tunnel sections, in which an installation of a catenary turns out to be particularly difficult and expensive and in which emissions caused by combustion engines constitute a great health risk for a worker, battery-powered rail vehicles prove to be particularly advantageous.

A rail vehicle suited for battery operation is known, for example, from DE 10 2012 216 312 A1.

Modern accumulators only require one sixth of the mass of lead accumulators of equal energy. This increasingly compact design results in an enormous energy density in a small space. This presents a heightened fire danger which has to be counteracted in a safe and reliable manner.

SUMMARY OF THE INVENTION

It is the object of the invention to indicate an improvement over the prior art for a rail vehicle of the type mentioned at the beginning.

According to the invention, this object is achieved by way of a rail vehicle according to the independent rail vehicle claim and a method according to the independent method claim. Advantageous further developments of the invention become apparent from the dependent claims.

The invention provides that the energy store has a tempering by means of a liquid dielectric, and that the vehicle superstructure includes a compartment, separated from the driver's cabin, in which the electric energy store is arranged within at least one fire protection cabinet with a dielectric tank located there above. The tempering by means of the liquid dielectric ensures a constant operating temperature of the energy store located in the fire protection cabinet. In the event of a failure, the dielectric tank serves for maintaining a cooling of the electric energy store. In addition, a spatial partition of driver's cabin and separated compartment guarantees a safe isolation in case of fire.

An advantageous embodiment of the invention provides that the compartment is accessible and is separated from the driver's cabin in particular by means of a fire protection wall and/or a passage. As a result of an accessibility of the compartment, maintenance- and inspection operations are particularly simple. The additional fire protection wall provides an additional time saving and safety factor in case of fire.

It is further advantageous if the electric energy store comprises an accumulator block which is formed in each case of a master module and at least one slave module, and if each module has several battery cells around which a dielectric flows. As a result of the modular design, the energy store is specifically matched to the operational requirements and the particular range of application. In addition, dielectric flows evenly around the accumulator cells, and heat generated during operation is effectively dissipated.

In this, it is useful if the electric energy store comprises several accumulator blocks which are arranged separated by fire protection panels in the fire protection cabinet. As a result, the accumulator blocks are housed one above the other in the fire protection cabinet in the most space-saving and efficient way. An additional separation by fire protection panels presents a further safety device in the event of fire.

A further improvement of the device according to the invention provides that the dielectric tank is connected to the fire protection cabinet via a fire-fighting line lockable by a controllable valve. In case of fire, the fire protection cabinet is flooded with additional dielectric from the dielectric tank via the opened controllable valve.

In a further improvement of the invention, the dielectric tank is connected via a compensating line to a dielectric circuit for tempering the electric energy store. Thus, the dielectric tank is used as a compensating reservoir for the dielectric circuit. A volume increase when the dielectric heats up is compensated via the compensating line and the dielectric tank.

In this, it is useful if the dielectric circuit comprises at least one pump, a heat pump and a temperature probe. The pump causes a forced circulation of the dielectric in the dielectric circuit and thus optimized heat dissipation. The heat pump is used for air-conditioning the driver's cabin. During this, the heat generated in the electric energy store is absorbed and raised to a higher temperature level by means of the heat pump. Via a heat exchanger, a heat exchange with a secondary medium takes place for the purpose of heating or cooling the driver's cabin, if needed. Consequently, less heating- or cooling power needs to be mustered, leading to a significant increase in range of the vehicle with consistent accumulator capacity. The temperature probe monitors the temperature of the dielectric and passes the values on to a control.

It is furthermore advantageous if the rail vehicle has an alarm unit, and if the alarm unit is coupled to a smoke sensor arranged in the fire protection cabinet and/or to a temperature sensor. An incident of fire is immediately detected via the smoke sensor and/or temperature sensor arranged in the fire protection cabinet, and an emergency report is sent by the alarm unit to an emergency call centre.

A further improvement of the invention provides that a power converter is arranged in a separate power converter cabinet in the compartment, and that at least one aerosol cartridge is arranged in the power converter cabinet. As a result of the spatial separation of power converter cabinet and fire protection cabinet, these are each sealed off from one another in case of fire. However, should there be a fire in the power converter cabinet, it is extinguished right away by an aerosol cartridge.

The method, according to the invention, of fire prevention or fire fighting within the electric energy store provides that, in an inoperative state, dielectric leaking in the event of a leakage as a result of a malfunction is compensated by dielectric from the dielectric tank via an opened fire-fighting line. In case of a leak or a burned-out accumulator cell, dielectric flows freely through the fire protection cabinet through the opened controllable valve.

In this it is useful if, in the event of a shut-down of the rail vehicle, the fire-fighting line is opened by means of a magnetic valve which has become currentless. Thus, the magnetic valve always stays open in the parked rail vehicle even if the power supply fails, so that the dielectric can flow freely into the fire protection cabinet in case of fire.

It is further advantageous if in an operating state, in case a temperature limit is detected within the electric energy store, a cooling capacity of a dielectric circuit is increased, and if a change in volume of the dielectric is compensated via a compensating line between the dielectric circuit and the dielectric tank. In this, the temperature of the dielectric is recorded continuously by means of a temperature probe or the temperature is recorded at a measuring spot in the fire protection cabinet. If the temperature limit is reached, the cooling power is increased by intensifying the dielectric circulation.

BRIEF DESCRIPTION OF THE DRAWINGS

The invention will be described by way of example below with reference to the attached figures. There is shown in schematic representation in:
FIG. 1 side view of rail vehicle
FIG. 2 top view of cabin
FIG. 3 view of fire protection cabinet
FIG. 4 detail view of accumulator blocks
FIG. 5 schematic of thermo management of accumulator
FIG. 6 schematic of fire protection accumulator
FIG. 7 schematic of power converter cabinet

DESCRIPTION OF THE EMBODIMENTS

Figure 6:
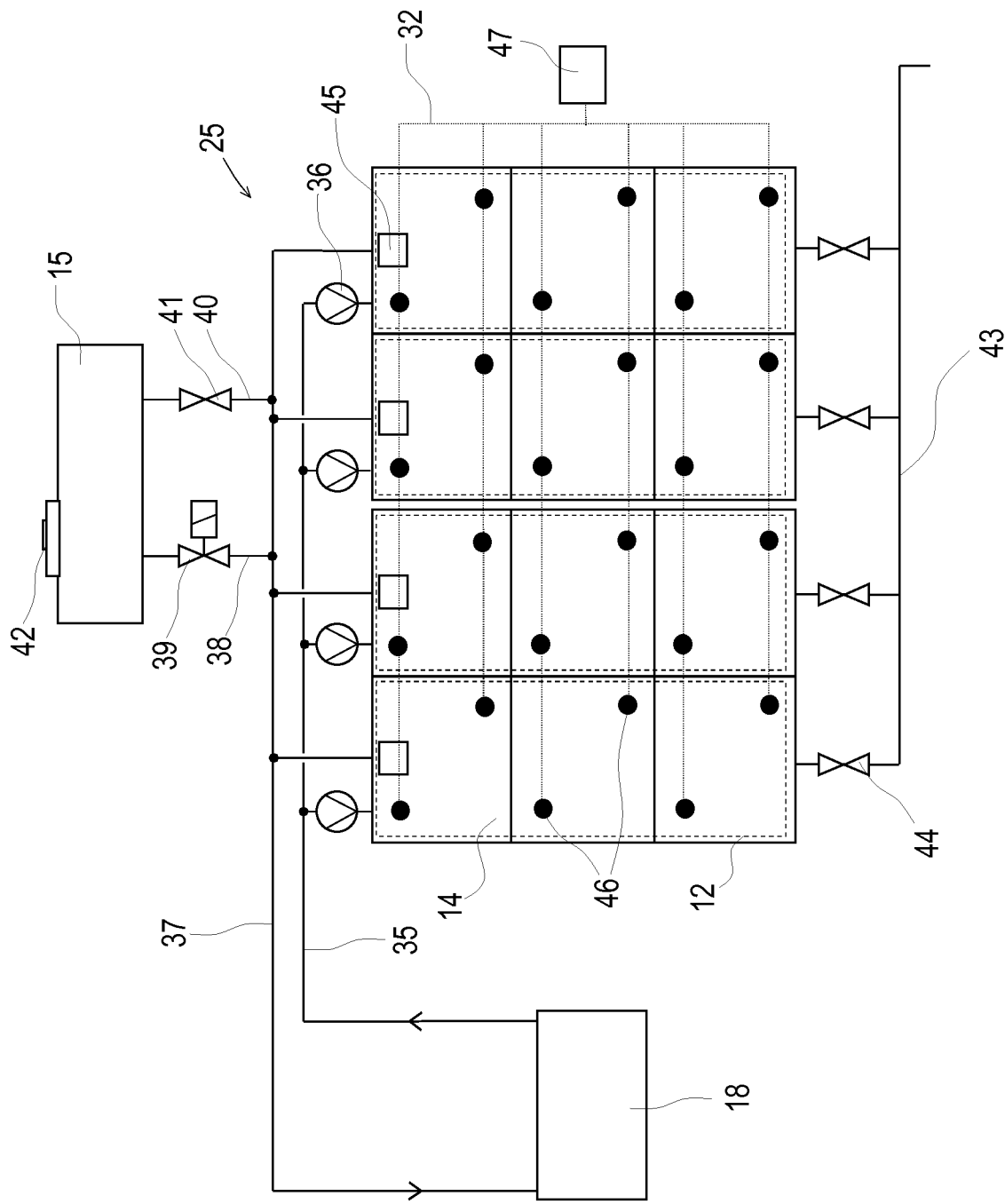

FIG. 1 shows a simplified representation of a rail vehicle 1 having a vehicle frame 3 supported on on-track undercarriages 2 and a vehicle superstructure 4 which, in the longitudinal direction 5 of the vehicle, has a passage 6 between a driver's cabin 7 at the end and a compartment 8. In addition to the passage 6, the compartment 8 is separated from the driver's cabin 7 by means of a fire protection wall 9. On the opposite front side, a second driver's cabin 10 is located. A work platform 11 is arranged between the compartment 8 and the second driver's cabin 10. A motive drive comprises an electric motor 13 powered by means of an electric energy store 12.

FIG. 2 shows a top view of the compartment 8. Therein, at the side facing away from the driver's cabin 7, two double fire protection cabinets 14 are arranged side-by-side. Located above each double fire protection cabinet 14, respectively, is a dielectric tank 15. Power converters 16 are positioned oppositely in power converter cabinets 17. A walk-through area is provided between the fire protection cabinets 14 and the power converter cabinets 17. Arranged in this area is a heat pump 18 for using heat emitted by the electric energy store 12.

For clarification of the arrangement, FIG. 3 shows a schematic cross-section of the compartment 8 with a front view of the two double fire protection cabinets 14 and the dielectric tanks 15 located there above. The fire protection cabinets 14 are arranged distanced by several spacers from a floor covering the vehicle frame 3. In this manner, a simple installation or removal of the fire protection cabinets 14 by means of a fork lift is possible.

Shown in FIG. 4 is the schematic structure of the electric energy store 12 inside a fire protection cabinet 14. In this, three accumulator blocks 19 are arranged one above the other, being sealed off from one another in each case by fire protection panels 20. The walls of the fire protection cabinet 14 are also lined with fire protection panels. An accumulator block 19 is composed in each case of a master module 21 and three individual slave modules 22. Each module 21, 22 is composed of several accumulator cells 24 around which a dielectric 23 flows.

The accumulator cells 24 are tempered by means of the dielectric 23 and thus are operated in an optimal temperature range. In case of overheating or igniting of an accumulator cell 24, the dielectric 23 additionally functions as an extinguishing medium which prevents a spreading to neighbouring accumulator cells 24. For tempering the dielectric 23, a dielectric circuit 25 is provided.

FIG. 5 shows in a schematic block diagram a thermo management of the energy store 12 with the dielectric circuit 25 and a second cooling circuit 26 provided for tempering the driver's cabin 7 and other units. The second cooling circuit 26 is operated with a glycol mixture and comprises an exterior cooler 27 as well as an auxiliary heater 28 in case a heat provided by the heat pump 18 is not sufficient.

Units connected to the second cooling circuit 26 are, for example, the electric motor 13 and a generator 29 which is coupled to a combustion engine and serves for charging the electric energy store 12. Via a heat exchanger 30, a heat exchange between the dielectric circuit 25 and the second cooling circuit 26 takes place.

The dielectric circuit 25 comprises a temperature probe 31 which is connected via a signal line 32 to the heat pump 18. The heat pump 18 is supplied by a power converter 33 which is connected to a control 34 via a further signal line 32.

A feed line 35 leads from the heat pump 18 via the heat exchanger 30 to pumps 36 which pump with a dielectric 23 into each energy store 12 within a fire protection cabinet 14. By a regulated pumping power, each energy store 12 within a fire protection cabinet 14 is tempered separately. A return line 37 carries the dielectric 23 back to the heat pump.

In FIG. 6, the dielectric circuit 25 is shown without the second cooling circuit 26. In this, four energy stores 12, each housed in a fire protection cabinet 14, are arranged with a common dielectric tank 15. In this, the dielectric tank 15 is connected by means of a fire-extinguishing line 38 to the return line 37 guided above the fire protection cabinets 14. During regular operation, the fire-extinguishing line 38 is closed off by means of an energized magnetic valve 39.

When the rail vehicle 1 is parked or in the event of a power failure, the magnetic valve 39 is opened. As soon as there is a leak in the system as a result of a defective accumulator cell 24, dielectric 23 flows automatically due to gravity via the fire-extinguishing line 38 and the return line 37 into the energy store 12 concerned. Thus, even in the event of the rail vehicle 1 being current-less, dielectric 23 still flows around the defective accumulator cell 24 so that any overheating or a cell fire can be contained before neighbouring accumulator cells 24 suffer damage.

In this, a volume compensation of the dielectric 23 between the dielectric circuit 25 and the dielectric tank 15 takes place via a compensation line 40. The latter is equipped with a shut-off valve 41 in order to lock the dielectric tank 15 for maintenance purposes. In addition, the dielectric tank 15 has a cover with a venting valve 42. For maintenance purposes, a drain line 43 with a drain valve 44 is also arranged at an underside of each fire protection cabinet 14.

As an additional safety measure, two temperature sensors 46 are associated with each accumulator block 19 of the energy store 12. Further, a smoke sensor 45 is arranged in the upper region of the respective energy store 12. Via a signal line 32, these sensors 45, 46 are connected to an alarm unit 47. As soon as a pre-set temperature threshold is exceeded or smoke is detected, a report to an emergency call center ensues. Favourably, the unit 47 comprises a separate battery in order to be operational also when the vehicle 1 is parked.

Additionally, each temperature sensor 46 is connected via a signal line 32 to the control 34. In case of a detected temperature increase of an energy store 12, the pumping power of the corresponding pump 36 is stepped up via the control 34. The increase in cooling power thus gained dissipates the additional heat and prevents any exceeding of a critical operating temperature.

Figure 7:
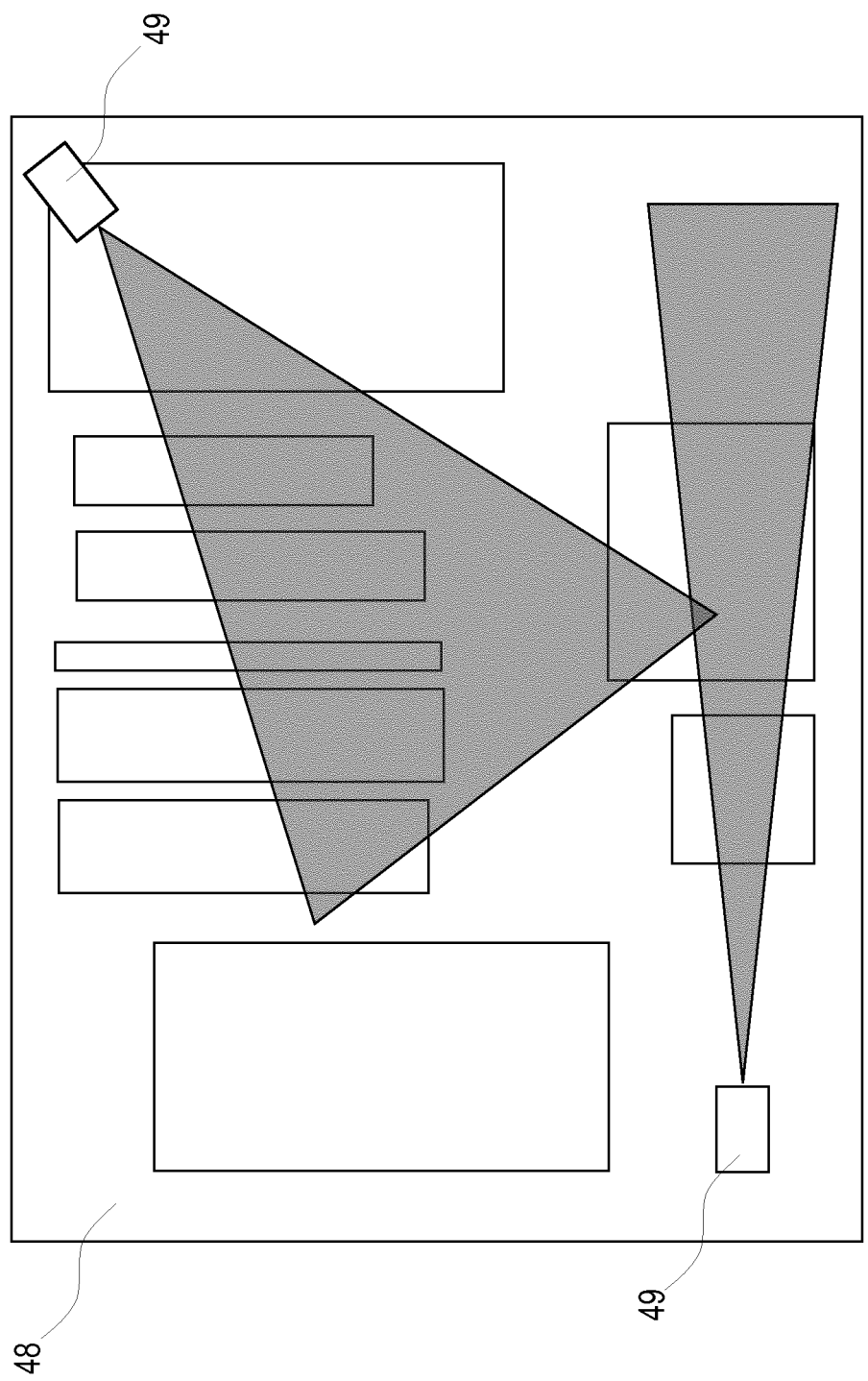

FIG. 7 shows schematically a power converter cabinet 48 with a power converter 33 located therein, in which two aerosol cartridges 49 are arranged for extinguishing in each case of fire.

The invention claimed is:

1. A rail vehicle, comprising:
    on-track undercarriages;
    a vehicle frame supported on said on-track undercarriages;
    a vehicle superstructure with at least one driver's cabin;
    an electric energy store;
    a motive drive having an electric motor supplied by means of said electric energy store;
    said electric energy store having a tempering by means of a liquid dielectric;
    said vehicle superstructure having a compartment with at least one fire protection cabinet and a dielectric tank, said compartment being separate from said driver's cabin, and in said compartment said electric energy store is disposed within said at least one fire protection cabinet with said dielectric tank disposed there above;
    a magnetic valve;
    a fire-fighting line lockable by said magnetic valve, wherein said dielectric tank is connected to said fire protection cabinet via said fire-fighting line; and
    the rail vehicle configured to, in an event of a shut-down of the rail vehicle, compensate for dielectric leakage as a result of a malfunction, with liquid dielectric from said dielectric tank via the fire-fighting line that is opened by the magnetic valve that has become currentless in the event of the shut-down of the rail vehicle.

2. The rail vehicle according to claim 1, wherein said compartment is accessible and is separated from said driver's cabin.

3. The rail vehicle according to claim 1, wherein said electric energy store has an accumulator block formed in each case of a master module and at least one slave module, and that each of said master and slave modules have several battery cells around which the liquid dielectric flows.

4. The rail vehicle according to claim 1, wherein said electric energy store has fire protection panels and several accumulator blocks which are disposed separated by said fire protection panels in said fire protection cabinet.

5. The rail vehicle according to claim 1, further comprising:
    a compensating line; and
    a dielectric circuit, said dielectric tank is connected via said compensating line to said dielectric circuit for tempering said electric energy store.

6. The rail vehicle according to claim 5, wherein said dielectric circuit has at least one pump, a heat pump and a temperature probe.

7. The rail vehicle according to claim 1, further comprising:
    a smoke sensor;
    a temperature sensor; and
    an alarm unit coupled to said smoke sensor disposed in said fire protection cabinet and/or to said temperature sensor.

8. The rail vehicle according to claim 1,
    wherein said compartment has a separate power converter cabinet;
    further comprising a power converter disposed in said separate power converter cabinet; and
    further comprising at least one aerosol cartridge disposed in said power converter cabinet.

9. The rail vehicle according to claim 1, wherein said vehicle superstructure has a fire protection wall and/or a passage and said compartment is accessible and is separated from said driver's cabin by means of said fire protection wall and/or said passage.

10. A method of fire prevention or fire fighting within an electric energy store, the method comprising the steps of:
    providing the rail vehicle according to claim 1; and
    compensating, in an inoperative state, a dielectric leaking in an event of a leakage as a result of a malfunction, by the liquid dielectric from the dielectric tank via the opened fire-fighting line.

11. The method according to claim 10, wherein in an operating state, in case a temperature limit is detected within the electric energy store, increasing a cooling capacity of a dielectric circuit, and compensating for a change in volume of the liquid dielectric via a compensating line between the dielectric circuit and the dielectric tank.

* * * * *